United States Patent Office 2,993,508
Patented July 25, 1961

2,993,508
CONTROL VALVE FOR WATER SOFTENING APPARATUS
Joseph P. Wagner, Knoxville, Tenn., assignor to Robertshaw-Fulton Controls Company, Richmond, Va., a corporation of Delaware
Filed Dec. 5, 1958, Ser. No. 778,521
5 Claims. (Cl. 137—609)

This invention relates to control valves for water softening apparatus and more particularly to valves of the type which are actuated by timers to automatically regenerate the water softening apparatus.

In general, such apparatus is provided with a water supply line, a house service line and a pair of tanks; one tank containing a mineral mixture for softening hard water and the other tank containing a brine solution for regenerating the mineral mixture. According to this invention, it is contemplated that a control valve interconnect the above apparatus to provide a service cycle, for delivering soft water to the house, and a series of cycles for regeneration which comprise a backwash cycle to remove foreign matter from the mineral tank and to expand the mineral bed, a regenerative cycle for regeneration of the mineral mixture, a rinse cycle for flushing the brine solution from the mineral tank, and an alternate rinse cycle for flushing the mineral tank at a lower flow rate.

One object of this invention is to make water available for use during all phases of the operation of the control valve by bypassing raw water to the house during regeneration.

Another object of this invention is to utilize pilot passage means to actuate valve means which pilot passage means is not subject to clogging due to impurities passing from the mineral tank during regeneration.

Another object of this invention is to facilitate the assembly or replacement of parts of the control valve.

Another object of this invention is to prevent the uncontrolled flow of raw water through the mineral tank during regeneration.

A further object of this invention is to utilize a check valve in conjunction with the outlet of the brine tank to allow the free flow of brine therethrough and yet permit relief of any pressure build up in the brine tank due to expansion of liquid or fluid contained therein.

Another object of this invention is to control a flow of raw water in such a manner that the flow rate is constant and independent of the water supply line pressure.

In accordance with one feature of this invention, there are disposed within a unitary casing several pressure operated valve means, check valve means, flow restrictors, and main pilot passages to control the flow of liquid therethrough to provide a service cycle and regeneration. The several pressure operated valve means are selectively actuated by means external to the control valve, as by example a timer, to automatically shift the cycles in accordance with a predetermined pattern required by the particular installation.

In accordance with another feature of this invention, two restrictors are disposed in separate flow passages within the valve casing for controlling the flow of raw water therethrough during regeneration. A pressure operated diaphragm valve means is disposed downstream from the restrictors and is responsive to the upstream and downstream pressures across the restrictors to maintain a constant pressure drop thereacross, with a resultant constant flow therethrough independent of variations in the upstream or inlet pressure.

In accordance with another feature of this invention, a plurality of pressure-operated solenoid-actuated valve means are provided with a novel common pilot passage means which is connected to the inlet for transmitting the static pressure thereat to one side of each of the valve means. Actuation of a single solenoid means produces a pressure drop sufficient to move the valve means between positions.

Other objects and advantages of this invention will be apparent from the following description taken in connection with the accompanying drawings wherein.

Figure 1:
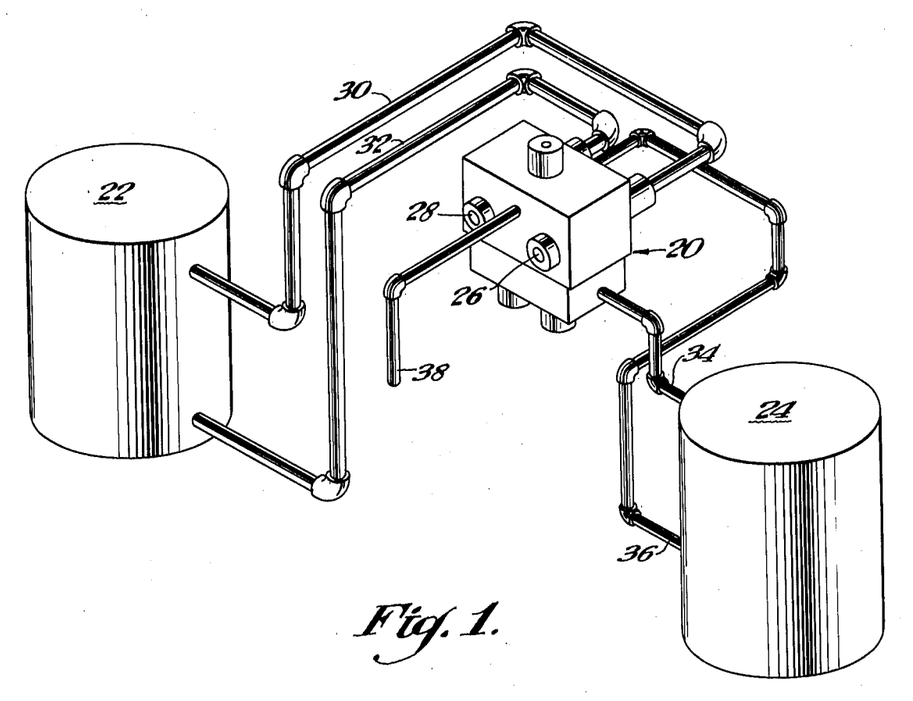
FIG. 1 is a somewhat schematic perspective view of a water softening system embodying this invention.

Referring now more particularly to the drawings, FIG. 1 shows a control valve 20 connected to a mineral tank 22 and a salt or brine tank 24. Control valve 20 is provided with an inlet 26, which is adapted to be connected to a source of pressurized, raw water, and an outlet 28, which is adapted to be connected to a house service line. Control valve 20 is connected to the top of mineral tank 22 by a pipe line 30 and to the bottom thereof by pipe line 32. Similarly, control valve 20 is connected to salt tank 24 by a pair of pipe lines 34 and 36. A drain pipe 38 is also connected to control valve 20.

Figure 2:
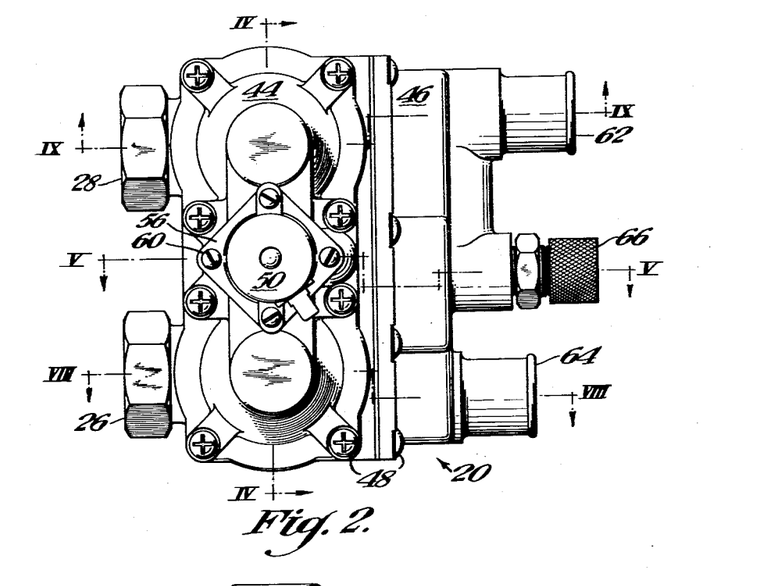
FIG. 2 is a top plan view of the control valve device shown in FIG. 1.
Figure 3:
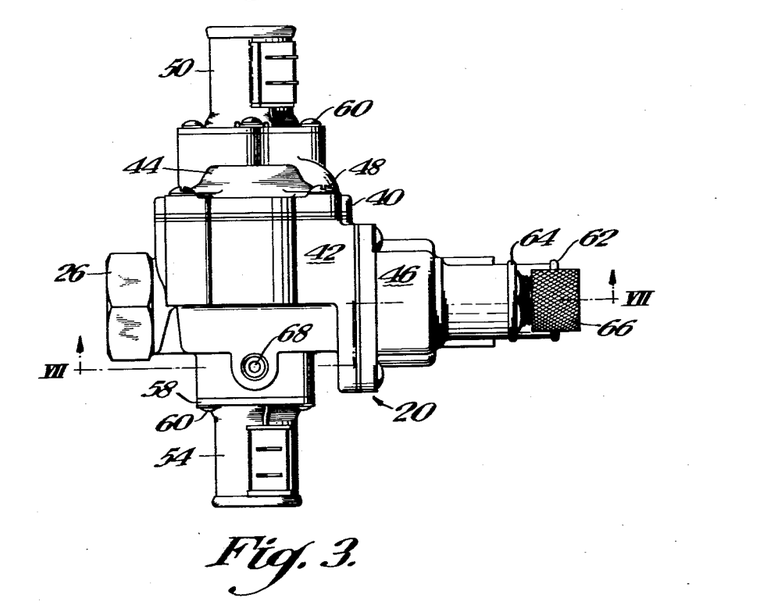
FIG. 3 is a side elevation view of the device shown in FIG. 2.

As shown in FIGS. 2 and 3, control valve 20 is provided with a casing 40 which comprises a main casing member 42 and secondary casing members 44 and 46, joined by a plurality of screws 48. Three solenoids 50, 52, and 54 are mounted on casing 40 by brackets 56 and 58 and a plurality of screws 60. Casing 40 is also provided with a pair of reverse flow ports 62 and 64, a brine inlet 66, and another outlet 68, which are adapted to be connected to pipe lines 32, 30, 36, and 34, respectively.

Figure 8:
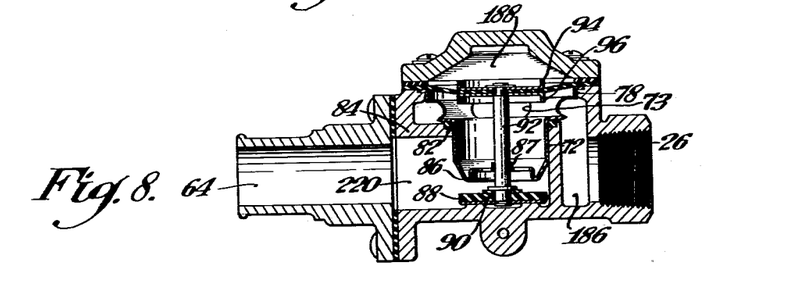
FIG. 8 is a cross-sectional view taken along line VIII—VIII of FIG. 2.

FIGS. 4 through 9 show the structural details of the interior of control valve 20. Valve means 70 comprises a stationary, substantially tubular valve seat member 72 which cooperates with a movable valve member 74 carried by a flexible diaphragm 76. As best shown in FIG. 8, valve seat member 72 is formed at one end with a flange 78 which is supported by an annular recess in casing member 42 and underlies diaphragm 76, gasket 80 and casing member 44. An annular seal 82 forms a fluid seal between valve seat member 72 and partition 84 of casing member 42. The other end of member 72 is partially bent backwardly to form a valve seat 86. An axial guide 87 is supported in a spaced relationship to the interior of member 72 by a pair of oppositely disposed spider arms (not shown). A plurality of flow apertures 73 are formed in member 72. Valve member 74 comprises a shallow cup-shaped member 88 containing a resilient member 90, adapted to engage valve seat 86. Resilient member 90 and member 88 are riveted together by upsetting one end of a rod 92. Rod 92 slidably extends through guide 87 and is attached at the other end thereof to diaphragm 76 and a pair of cup-shaped members 94 and 96 disposed in a back-to-back relationship on either side of diaphragm 76.

Figure 9:
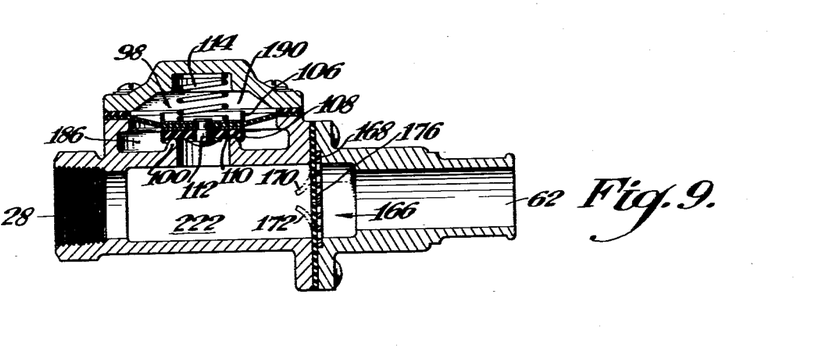
FIG. 9 is a cross-sectional view taken along line IX—IX of FIG. 2.
Figure 10:
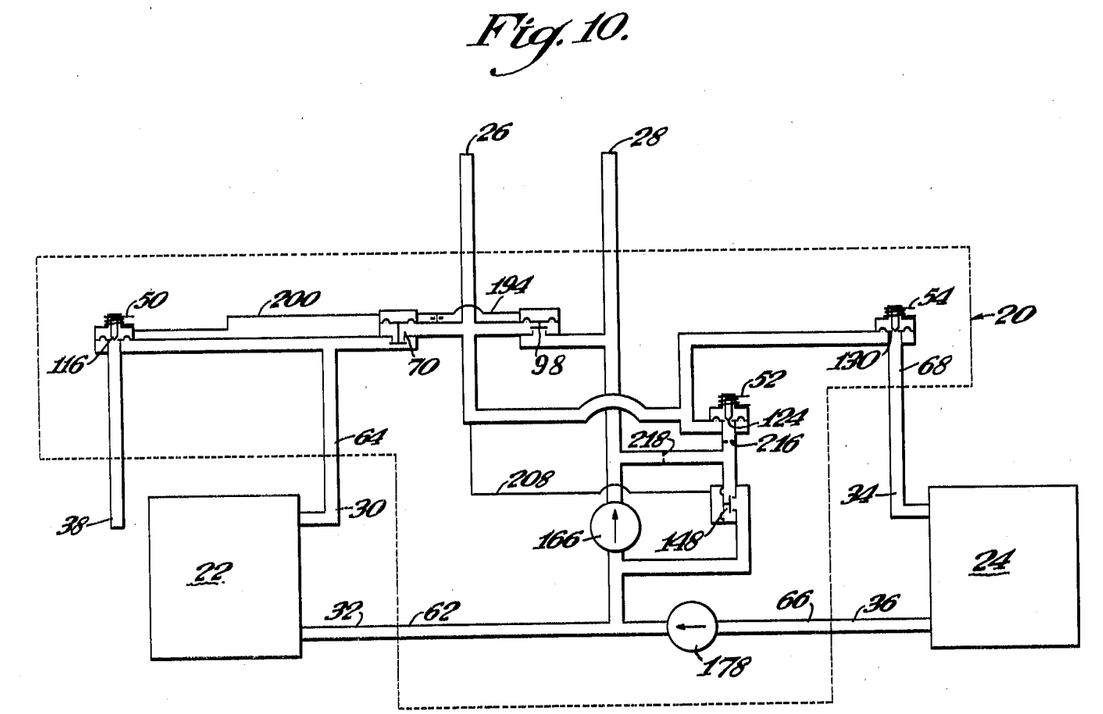
FIG. 10 is a schematic elevational view of the system shown in FIG. 1.

Valve means 98 comprises a valve seat 100, formed in casing member 42, and a movable valve member 102 carried by a flexible diaphragm 104. Valve member 102, as best shown in FIG. 9, comprises a pair of cup-shaped members 106 and 108 disposed in a back-to-back relationship on either side of diaphragm 104. A resilient member 110 is disposed in member 108. Valve member 102 is held together by rivet means 112. Diaphragm 104 is clamped between gasket 80 and casing member 42. A helical spring 114 biases valve member 102 towards engagement with valve seat 100.

Valve means 116 comprises a valve seat 118 and a flexible diaphragm valve member 120. Diaphragm 120 is formed with a central aperture therethrough for a purpose hereinafter described. The outer periphery of diaphragm 120 is clamped between casing member 44 and ring 122.

Valve means 124 is a pressure-operated, solenoid-actuated type and comprises a diaphragm 126 which cooperates with a valve seat 128. Diaphragm 126 is conventional and has a central aperture, or pilot hole, and a bleeder passage formed therein.

Similarly, valve means 130 comprises a diaphragm 132, formed with a pilot hole and a bleeder passage therein, which cooperates with a valve seat 134. It should be noted that diaphragms 132 and 126 are similar to diaphragm 120 except that diaphragms 132 and 126 have bleeder passages therein.

Figure 4:
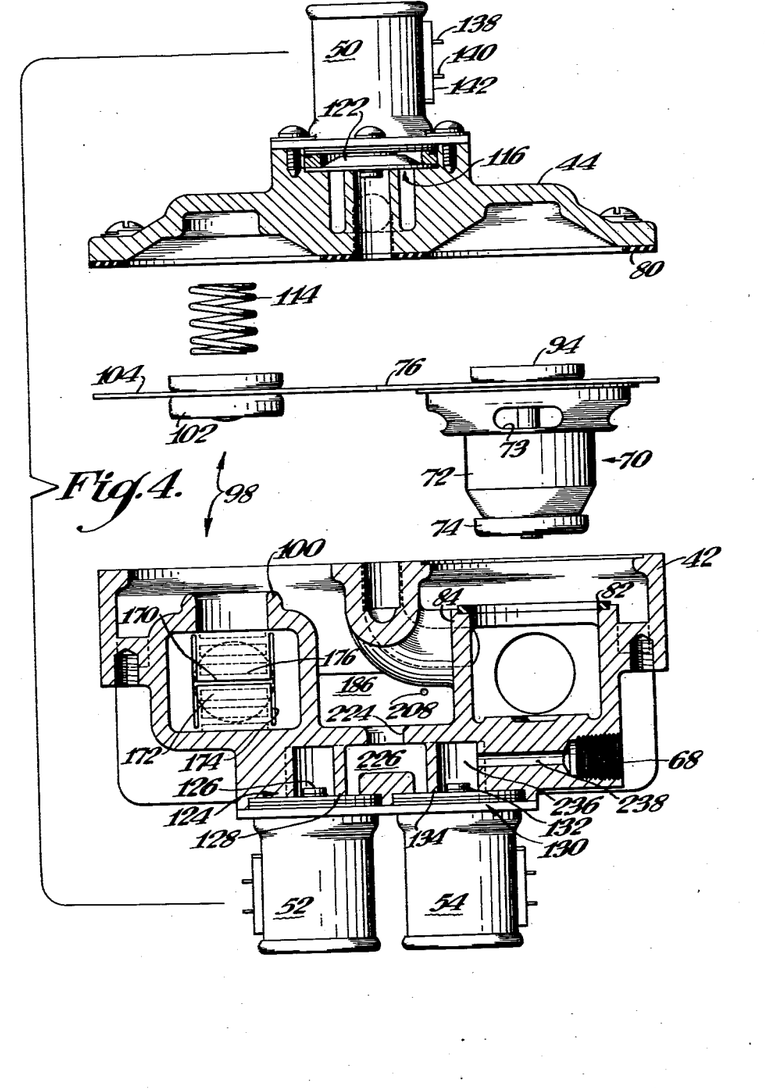
FIG. 4 is an exploded, enlarged partial cross-sectional view taken along line IV—IV of FIG. 2.
Figure 5:
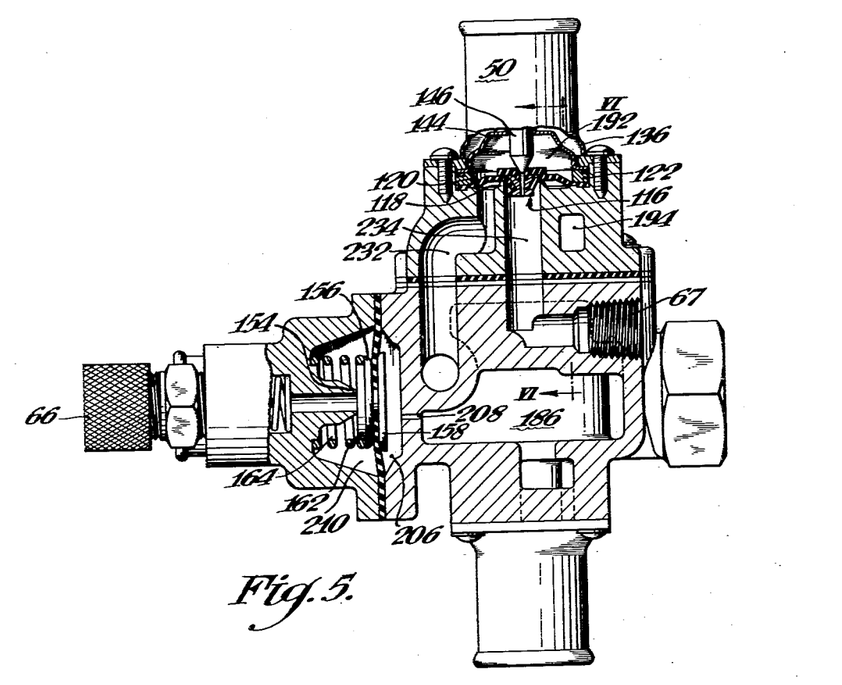
FIG. 5 is an enlarged, partial cross-sectional view taken along line V—V of FIG. 2.
Figure 6:
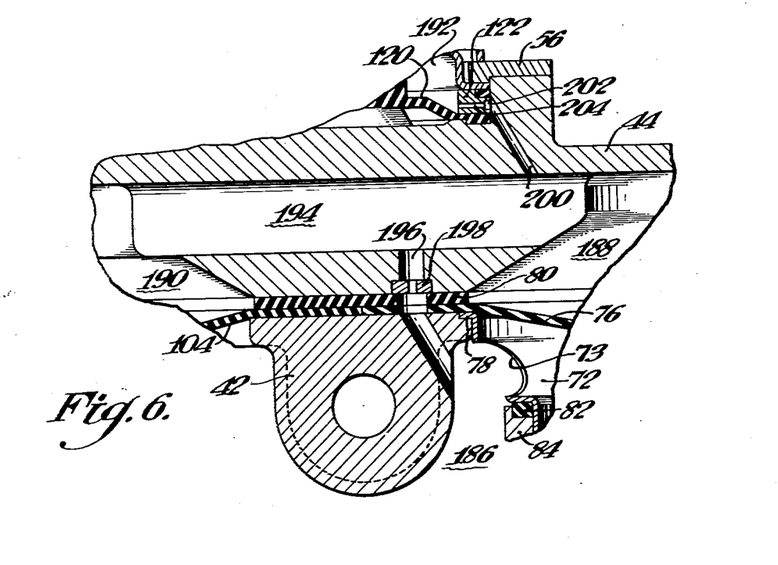
FIG. 6 is an enlarged cross-sectional view of a portion of the device shown in FIG. 5 taken along line VI—VI.
Figure 7:
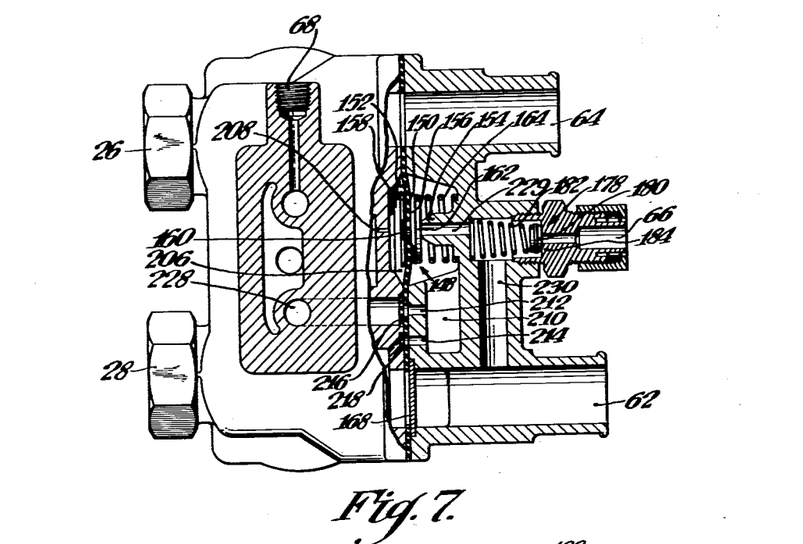
FIG. 7 is a partial cross-sectional view with portions broken away taken along line VII—VII of FIG. 3.

Solenoids 50, 52, and 54 are similar in construction so that only one need be described in detail. Solenoid 50, as best shown in FIGS. 4 and 5, is provided with a casing 136 which encloses a conventional coil having a pair of terminals 138 and 140 extending outwardly through a terminal block 142. An end closure cap 144 forms a guide housing for a spring biased armature 146 which is cooperable with the diaphragm 120 to open and close the central aperture therethrough. Cap 144 is formed with a flange which is disposed between ring 122 and bracket 56. Armature 146 is normally biased into engagement with diaphragm 120. Similarly, solenoids 52 and 54 have armatures (not shown) which cooperate with diaphragms 126 and 132.

Pressure regulating valve means 148 comprises a valve member 150, carried by a diaphragm 152, and a valve seat 154. Valve member 150 comprises a pair of cup-shaped members 156, 158 disposed in a back-to-back relationship on either side of diaphragm 152 and connected thereto by a rivet means 160. Member 156 carries a disc member 162 which cooperates with the valve seat 154. A spring 164 extends between valve member 150 and casing member 46, and unbalances diaphragm 152 to maintain approximately a 10 p.s.i. pressure differential across the diaphragm 152.

Diaphragm 152 also serves as a gasket between casing members 42 and 46. In addition, one portion of diaphragm 152 forms a part of check valve means 166 which comprises a valve seat member 168 and flap valve members 170, 172 formed by an H-shaped slot 174 in diaphragm 152. Valve seat member 168 has a plurality of slots 176 formed therein which may be completely covered by flaps 170, 172.

Check valve means 178 comprises a resilient valve member 180, carried by an end loop of a conical spring 182, which is biased towards engagement with a valve seat 184.

Inlet 26 communicates with a cavity 186 which extends partially around partition 84 and comprises the major portion of the interior of casing 40. A pair of chambers 188, 190 are formed between casing member 44 and diaphragms 76 and 104, respectively. A chamber 192 is formed between cap 144 and diaphragm 120. Chambers 188, 190 and 192 communicate with each other and with cavity 186 through pilot passage means. A passage 194 extends between chambers 188 and 190 and communicates with cavity 186 through a pilot passage 196 which extends through casing member 44, a restrictor 198, gasket 80, diaphragm 76, and casing member 42. A pilot passage 200 communicates at one end with passage 194 and extends upwardly and communicates with a groove 202, formed about the outer periphery of ring 122, which in turn communicates with at least one passage 204, extending through ring 122 from groove 202, which in turn communicates with chamber 192. The groove 202 is formed in ring 122 to eliminate the necessity for any critical alignment of the pilot means therethrough with the pilot passage 200. The water that passes through valve means 116 to the drain connection in general contains a considerable amount of foreign matter, which is undesirable for use as pilot water. For this reason, the pilot means is connected to inlet 26, rather than through a bleeder passage in diaphragm 120.

A chamber 206 is formed between diaphragm 152, in the vicinity of valve means 148, and casing member 42. Chamber 206 communicates with cavity 186 through pilot passage 208. A chamber 210 is formed between diaphragm 152 and casing member 46. A pair of restrictors 216 and 218 are disposed between casing members 42 and 46 in flow passages 212 and 214, respectively.

Before proceeding with a detail description of the overall operation of control valve 20, it will first be necessary to understand the operation of the various valve means therein.

When inlet 26 is connected to a pressurized source of raw water, the pressure at inlet 26 is transmitted through cavity 186 to chambers 188, 190, and 192 by pilot passages 196, 194, and 200. When solenoid 50 is not energized, the armature 146 closes the central aperture of diaphragm 120 and there will be no flow through the chambers and the pilot passages; hence, there will be developed within chambers 188, 190, and 192 a static pressure which is nearly equal to that of the pressure at inlet 26. The pressures on both sides of diaphragm 76 are nearly the same so that valve member 74 will be slightly disengaged from valve seat 86. With a flow of water through valve means 70, the pressure on the undersurface of diaphragm 76 will be less than the pressure on the top and causes diaphragm 76 to move downwardly slightly and thereby move valve member 74 further away from valve seat 86. At the same time, the static pressure in chamber 190 acts on a top surface of diaphragm 104, in conjunction with spring 114, to hold valve member 110 in engagement with valve seat 100. Likewise, the pressure in chamber 192 forces diaphragm 120 into engagement with valve seat 118. The pressures on the undersurface of both diaphragms 104 and 120 are insufficient to cause the respective valve members to disengage from their associated valve seats.

When solenoid 50 is energized, the armature 146 is withdrawn into the end closure cap 144 and thereby uncovers the central aperture in diaphragm 120. Consequently, a small amount of water will flow through pilot passage 196, restrictor 198, passage 194, passage 200, chamber 192 and through the central aperture of diaphragm 120 to the drain. This flow causes a pressure drop across the restrictor 198 and the pressures in the chambers 188, 190, and 192 are reduced below that of the inlet pressure. Consequently, the pressures underneath diaphragms 104, 76, and 120 cause the associated valve members to move between positions. When solenoid 50 is not energized, valve means 70 is open and valve means 98 and 116 are closed. When solenoid 50 is energized, valve means 70 is closed and valve means 98 and 116 are open.

Pressure regulating valve means 148 functions to maintain a constant pressure drop across restrictors 216 and 218 to maintain a constant flow therethrough independent of variations in the inlet pressure. The inlet pressure is transmitted through cavity 186 and pilot passage 208 to chamber 206 and tends to force valve member 156 towards engagement with valve seat 154 against the bias of spring 164. The inlet pressure, in effect, is the upstream pressure at both restrictors 216 and 218, when there is a flow therethrough, and since flow passages 212 and 214 communicate directly with chamber 210 on the opposite side of diaphragm 152, the downstream pressure of the restrictors 216 and 218 is the same as the pressure underneath the diaphragm 152.

The pressure differential valve means 148 is normally open and works in conjunction with spring 164 to modulate between positions to maintain a constant pressure drop across restrictors 216 and 218 independent of the variations in the inlet pressure. With such a constant pressure drop, the restrictors 216 and 218 maintain a constant flow and may be properly sized to give the recommended rates of flow during the desired cycle.

Valve means 124 and 130 are similar in operation. For instance, when solenoid 52 is not energized, the armature associated therewith covers the pilot hole therethrough so that the pressure underneath the diaphragm 126 is transmitted to the top side thereof through the bleeder passage. Because of the force unbalance on both sides of diaphragm 126, the valve means 124 remains closed. Upon energization of solenoid 52, the armature is attracted to uncover the pilot hole. This causes a pressure drop across diaphragm 126 such that the force on the underneath surface thereof moves the diaphragm 126 away from valve seat 128 to open valve means 124. De-energization of solenoid 52 causes valve means 124 to close.

As previously indicated, control valve 20 provides a service cycle and regeneration which comprises a backwash, a regenerative, and a rinse and/or alternate rinse cycle. During the service cycle, none of the solenoids are energized and the flow of water through control valve 20 occurs in response to the opening of an outlet within the house service line in accordance with the desires of the user, such as a housewife opening a faucet. Upon the happening of this event, raw water will flow through inlet 26, cavity 186, valve means 70, chamber 220, and reverse flow port 64 to mineral tank 22. The water flowing through mineral tank 22 is softened by the chemical reaction of the mineral mixture with the impurities within the raw water. After passing through mineral tank 22, the softened water reenters control valve 20 through reverse flow port 62 and serially flows through check valve means 166, chamber 222, and outlet 28 to the house service line. Check valve means 178 remains closed throughout this cycle due to the pressure on the back side thereof which tends to seat valve member 180 against valve seat 184.

During the backwash cycle, solenoids 50 and 52 are energized. Upon the energization of solenoid 50, valve means 70, 98, and 116 move between positions in response to a decrease in pressure across the respective diaphragms thereof so that valve 70 closes and valve means 116 and 98 open. Energization of solenoid 52 causes valve means 124 to move from a closed to an open position. It should be noted that when solenoid 50 is energized, valve means 70 is closed and valve means 98 is open, and raw water is available for use in response to opening of an outlet within the house service line and flows directly from inlet 26 through valve means 98 to outlet 28. From cavity 186, water flows in two parallel paths to chamber 210. The first path flows from cavity 186 through valve means 98, chamber 222, flow passage 214 and restrictor 218 into chamber 210. The second path flows from cavity 186, through flow passage 224, chamber 226, valve means 124, flow passage 228, flow passage 212, and restrictor 216 to chamber 210.

Then, the water flows from chamber 210 through valve means 148, passage 229, passage 230, and reverse flow port 62 to the mineral tank 22. The water flows through mineral tank 22 from bottom to top and in so doing expands the mineral bed therein and flushes foreign matter that has become entrapped within mineral tank 22 therefrom. The water leaves mineral tank 22 and flows through reverse flow port 64, chamber 220, flow passage 232, valve means 116, flow passage 234, and the drain outlet 67 to drain pipe 38 which exhausts at atmospheric pressures.

The pressure drop through control valve 20 is so designed that during regeneration, the pressure at reverse flow port 62 is merely sufficient to cause the fluid to pass upwardly through mineral tank 22 and to the atmosphere through drain pipe 38. This pressure has been found to be, in most installations, in the range of 5 p.s.i., or less. Consequently, the drop from line pressure at inlet 26 to this 5 p.s.i., or less, occurs across restrictors 216 and 218 and pressure regulating valve means 148. Furthermore, since check valve means 166 is closed, the pressure differential, between line pressure and 5 p.s.i., exists thereacross.

During the regenerative cycle, solenoids 50 and 54 are energized. Consequently, valve means 70 and 124 are closed and valve means 98, 116, and 130 are open. Water flows in parallel paths from cavity 186 and later remixes downstream from check valve means 178. One path is similar to one of the flow paths of the previous cycle and comprises, in series, cavity 186, valve means 98, chamber 222, restrictor 218 and flow passage 214, chamber 210, valve means 148, passage 229, and passage 230. The other path comprises, in series, cavity 186, flow passage 224, chamber 226, valve means 130, chamber 236, passage 238 and outlet 68 to the brine tank 24. Water flowing through tank 24 dissolves some of the salt therein so that brine flows from tank 24 through inlet 66, check valve means 178, and inlet passage 230, where it mixes with raw water flowing from passage 228. This mixture of raw water and brine then passes from passage 230 through mineral tank 22 and through the drain 67 in the manner previously described. By chemical reaction the mineral contained within tank 22 is regenerated.

During the regenerative cycle, the only pressure necessary at inlet 66 is that which is required to force the brine past check valve means 178, through mineral tank 22, and out drain 38. This pressure has been found to be, in most installations, in the range of 5 p.s.i. or under. Since the inlet pressure is normally much greater, a flow control means (not shown) is provided on the inlet side of the salt tank 24, and the full pressure drop from the inlet pressure to the 5 p.s.i. or less pressure required to force the brine to the drain 38 occurs across this flow control means. When the regenerative cycle is complete, a timer switches control valve 20 to the rinse cycle and, immediately, the check valve means 178 closes to prevent the pressure from building up in brine tank 24.

Under normal conditions, the pressure within salt tank 24 remains relatively low and check valve means 178 prevents brine from entering the system, except during a regenerative cycle. However, should the presure difference across check valve means 178 increase so as to unseat valve member 180, brine will flow into the system. In one case, this might occur if the pressure at inlet 26 decreases below the pressure within tank 24. This would be an unusual circumstance, such as loss of pressure within the source of raw water delivered to inlet 26, and would not be likely to happen.

The leakage of brine into the system also occurs in response to thermal expansion of fluid within salt tank 24. Since water coming into the tank 24 might be as low as 40° F. and the softener may be in such a location as to have an ambient temperature of approximately 90° F., the 50° rise in temperature, or any other extremely wide temperature change, would cause the pressure of fluid entrapped in tank 24 to build up until check valve means 178 opens to expel some of the brine into the system and thereby relieve the pressure within tank 24. In effect, check valve means 178 also functions as a safety pressure relief valve. Such a small leakage would be more desirable than a failure or rupture of tank 24.

Another advantage is that during normal service, there exists the full pressure drop across valve means 130 and check valve means 178 which helps seat these valve means to prevent leakages due to foreign particles being entrapped at the seats thereof.

With the low pressure in the salt tank 24, it is possible to recharge without interruption of the normal service cycle. Since brine tanks are normally provided with manual drain valves, it is only necessary to drain the brine tank 24 sufficiently to make room for the additional salt. Since the inlet and outlet to the brine tank 24 are positively closed by a valve means 130 and check valve means 178, no water will flow into the tank at this point, thus permitting the addition of salt.

Afer such a regenerative cycle, it becomes necessary to rinse brine from the mineral tank 22. To do so, solenoids 50 and 52 are energized and water flows through the system in the same manner as described with reference to the backwash cycle. The rinse cycle is continued until the brine is flushed from mineral tank 22. However, in some applications it may be desirable to flush or rinse mineral tank 22 at a lower flow rate than that of the backwash cycle which must be necessarily great enough to pick up any foreign matter, such as pipe scale, contained within mineral tank 22. For the alternate rinse cycle, only solenoid 50 is energized. In this case, water flows serially through cavity 186, valve means 98, chamber 222, flow passage 214 and restrictor 218, chamber 210, valve means 148, passage 229, passage 230, reverse flow port 62, mineral tank 22, reverse flow port 64, chamber 220, flow passage 232, valve means 116, flow passage 234 and drain outlet 67. The size of restrictor 218 determines the rate of flow of raw water which mixes with the concentrated brine to effect the proper proportion thereof. In addition, restrictor 218 determines the rate of flow during the alternate rinse cycle. Restrictor 216 determines the rate of flow during the backwash and rinse cycles.

To summarize the various positions of the principal valve means and the solenoids, the following table is provided:

| Cycle | Position | | | | | | | |
|---|---|---|---|---|---|---|---|---|
| | Valve Means | | | | | Solenoid | | |
| | 70 | 98 | 116 | 124 | 130 | 50 | 52 | 54 |
| Service | O | C | C | C | C | | | |
| Backwash | C | O | O | O | C | X | X | |
| Regenerative | C | O | O | C | O | X | | X |
| Rinse | C | O | O | O | C | X | X | |
| Alternate Rinse | C | O | O | C | C | X | | |

In the above table, "C" represents a closed position, "O" represents an open position, and "X" represents an energized position.

It is obvious that the flow of water through control valve 20 is controlled by the energization of solenoids 50, 52 and 54. To control the energization of the several solenoids, it is necessary to provide a switch means therefor. It is recognized that while individual switch means may be provided for each of the solenoids, that it is preferable to provide a timer switch means to relieve the user of control valve 20 of the responsibilities for continuously determining the length of the periods of the various cycles. It is preferable that the timer switch means be provided with adjustments to selectively vary the lengths of the various cycles and that once set, it will be unnecessary to readjust the various periods. The timer switch means is set to selectively actuate solenoids 50, 52, and 54 to provide in sequence the service cycle, backwash cycle, regenerative cycle, and rinse and/or alternate rinse cycles. In the event of a power failure, the system is held in a service cycle.

It should be noted, also, that the various working elements contained within casing 40 are easily accessible by removal of casing member 44 or 46. The separate diaphragms 104 and 76 which are connected to valve means 98 and 70, may be removed as units. Likewise, the restrictors 216 and 218 are easily accessible and may be changed to vary the flow rate through the control valve 20 in accordance with the needs of a particular system.

Control valve 20 is basically designed for installation in a pressurized system; however, with obvious alterations, it could be installed in an open tank system, a salt-in-head system, or other systems. Furthermore, although control valve 20 has been described with reference to water softening apparatus, its use is not so limited since it is obvious that it could be used with any apparatus having similar fluid distribution requirements. Many changes may be made in the details and arrangement of parts without departing from the invention as defined in the appended claims.

I claim:

1. A control valve comprising a casing formed with first and second inlets, first and second outlets, first and second reverse flow ports, and a drain outlet, first passage means extending between said first inlet and said first reverse flow port, first valve means disposed within said first passage means and being movable between positions for controlling a flow of fluid from said first inlet to said first reverse flow port, second passage means connected at one end to said first passage means and being connected at the other end thereof to said drain outlet, second valve means disposed within said second passage means and being movable between positions for controlling a flow of fluid from said first reverse flow port to said drain outlet, third passage means extending between said first inlet and said first outlet, third valve means disposed within said third passage means and being movable between positions for controlling a flow of fluid from said first inlet to said first outlet, said first and third valve means being pressure responsive and actuated by said second valve means, fourth passage means extending between said first inlet and said second reverse flow port, fourth valve means disposed within said fourth passage means and being movable between positions for controlling the flow of fluid from said first inlet to said second reverse flow port, fifth passage means extending between said fourth passage means and said second outlet, fifth valve means disposed within said fifth passage means and being movable between positions for controlling the flow of fluid from said first inlet to said second outlet, sixth passage means extending between said second inlet and said fourth passage means, first check valve means disposed within said sixth passage means for unidirectionally controlling the flow of fluid from said second inlet to said second reverse flow port, seventh passage means extending between said first outlet and said fourth passage means, second check valve means disposed within said seventh passage means for unidirectionally controlling the flow of fluid from said second reverse flow port to said first outlet; and actuating means operably connected for moving each of said second, fourth, and fifth valve means between positions.

2. The device of claim 1 wherein restrictor means is disposed within said fourth passage means downstream from said fourth valve means to restrict the flow of liquid therethrough, and pressure regulating valve means are disposed downstream from said restrictor means and are responsive to pressure at said first inlet to maintain a constant pressure drop across said restrictor means.

3. The device of claim 2 wherein an eighth passage means extends between said seventh passage means and said fourth passage means intermediate said restrictor means and said pressure regulating valve means, and a second restrictor is disposed within said eighth passage means.

4. A control valve comprising a casing formed with first and second inlet ports, first and second outlet ports, first and second reverse flow ports, a drain outlet, a first conduit connecting said first and second reverse flow ports, a second conduit connecting said second outlet to said second inlet, a first passage interconnecting said inlet with said first reverse flow port, a pressure responsive valve biased to a normally open position and disposed in said first passage means, a pressure responsive chamber being located in said pressure responsive valve and being adapted for actuating said valve between open and closed positions, a second passage interconnecting said first passage downstream of said pressure responsive valve with said drain outlet, valve means disposed in said second passage, a pilot passage interconnecting said inlet with said valve means and being adapted to communicate with said pressure responsive chamber of said pressure responsive valve, said valve means being operable to open said drain passage to actuate said pressure responsive valve to the closed position, a third passageway interconnecting said second reverse flow port with said first outlet, a fourth passageway interconnecting said second inlet with said third passageway, a fifth passageway interconnecting said first inlet with said second outlet, first check valve means disposed in said fourth passageway, and second check valve means disposed in said third passageway operable in response to actuation of said pressure responsive valve and being adapted for unidirectionally controlling fluid flow to said first outlet, said first check valve means restricting flow of fluid through said second conduit from said second outlet when said pressure responsive valve means is actuated to the open position.

5. The device of claim 4 wherein said first check valve means is actuated to the open position when the fluid pressure in said second conduit exceeds the fluid pressure in said third passage whereby pressure in said second conduit is maintained at a maximum value which is substantially equal to the pressure in said third passage.

References Cited in the file of this patent

UNITED STATES PATENTS

| | | |
|---|---|---|
| 1,878,019 | Stickney | Sept. 20, 1932 |
| 2,265,225 | Clark | Dec. 9, 1941 |
| 2,588,317 | Zimmerman | Mar. 4, 1952 |
| 2,744,867 | Webb | May 8, 1956 |
| 2,832,373 | Scholer | Apr. 29, 1958 |